United States Patent

Murata et al.

[11] Patent Number: 6,074,741
[45] Date of Patent: Jun. 13, 2000

[54] ANTIGLARE MATERIAL AND POLARIZING FILM USING THE SAME

[75] Inventors: Chikara Murata; Kazuya Ohishi; Yasuhiro Matsunaga; Kazuhiro Yamasaki; Yukinori Sakumoto, all of Shizuoka, Japan

[73] Assignee: Tomoegawa Paper Co., Ltd., Tokyo, Japan

[21] Appl. No.: 09/046,675

[22] Filed: Mar. 24, 1998

[30] Foreign Application Priority Data

Mar. 27, 1997 [JP] Japan .................................. 9-074908

[51] Int. Cl.$^7$ ....................................................... B32B 5/16
[52] U.S. Cl. ........................... 428/327; 428/206; 428/212; 428/323; 428/332
[58] Field of Search ................................ 428/323, 206, 428/327, 212, 332.339, 341; 359/483, 185, 493, 601; 525/227

[56] References Cited

U.S. PATENT DOCUMENTS 5,473,019 12/1995 Siol et al. ................................. 525/227
5,886,819 3/1999 Murata et al. ........................... 359/483

FOREIGN PATENT DOCUMENTS 1-105738 4/1989 Japan .
5-162261 6/1993 Japan .

*Primary Examiner*—William Krynski
*Assistant Examiner*—Hong J. Xu
*Attorney, Agent, or Firm*—McDermott, Will & Emery

[57] ABSTRACT

The invention provides an antiglare material which exhibits excellent antiglare property by preventing shining of external light in a display and is suitable for display of vivid and high-definition images free of any glare, and a polarizing film using the same. The antiglare material includes a transparent substrate provided with a roughened surface layer on one or both sides thereof. The roughened surface layer is formed from an ultraviolet curing resin containing at least an epoxy compound and a photo-cationic polymerization initiator, and beads of a crosslinked acrylic resin. The polarizing film is constructed by laminating a first protective material, which is provided with a roughened surface layer formed from an ultraviolet curing resin containing at least an epoxy compound and a photo-cationic polymerization initiator, and beads of a crosslinked acrylic resin on one side thereof, on one side of a polarizing substrate, and laminating a second protective material on the other side of the polarizing substrate. The crosslinked acrylic resin beads include at least 60 wt. % of particles having a particle size ranging from 0.5 to 6.0 $\mu$m and less than 20 wt. % of particles having a particle size greater than 6.0 $\mu$m. The HAZE values of the transparent substrate and first protective material fall within a range of 3–30.

12 Claims, 2 Drawing Sheets

6,074,741

ANTIGLARE MATERIAL AND POLARIZING FILM USING THE SAME

BACKGROUND OF THE INVENTION

1. Field of the Invention

The present invention relates to an antiglare material which is suitable for use in image displays such as LCD (liquid crystal display) and CRT (cathode-ray tube) and particularly imparts excellent glare-reduction, chemical resistance, abrasion resistance and resistance to stains such as fingerprints to image-displaying parts, and to a polarizing film making use of such a material.

2. Description of the Related Art

It is a very common technological practice under rapid progress in recent years that various kinds of image display devices, referred to simply as "displays" hereinafter, including LCDs and CRTs as typical examples are widely employed in a variety of fields for the exhibition of images and patterns as in television sets, computer terminals and the like. While one of the key problems in the initial stage of their development was to accomplish conversion of the black-and-white displays into colored displays, it is a recent trend in the development works to accomplish upgrading of the image quality of the displays with higher and higher resolution as represented by the movement toward the new television broadcasting system of increased image resolution in addition to a further target of the development works to accomplish saving of the electric power consumption in the displays. These innovative display systems are expected to play a very important role in the man-machine interphases with wider and wider prevalence along with the advent of the era of so-called multimedia including, in particular, a variety of portable terminals of communication systems represented by portable telephones, PHS, and the like.

It would be a due expectation that LCDs are the only displays which occupy the market of the displays for portable terminals since they are the lightest in weight and can be designed with compactness along with their versatility for any types of displays. Since these portable terminals are frequently used outdoors, it is important to ensure good visibility of the images exhibited on the display screen even under daylight by suppressing reflection of external light incident on the display screen such as the sunlight as completely as possible. As being urged by the requirement in these fields, it is eagerly desired to develop an efficient antiglare means on the display screen which prevents imaging reflection of external light sources such as the sun, fluorescent lamps and the like on the display screens.

More recently, displays which are directly touched with fingers to operate, such as touch panels, have come to be marketed. There has thus been an increasing demand for development of a display having a faceplate high in abrasion resistance and chemical resistance and good in resistance to stains such as fingerprints.

With respect to glare-reduction, in order to realize glare protection of this kind, it has heretofore been conducted to scatter or diffuse light like polished glass, thereby vignetting images. In order to scatter or diffuse light, it is generally a basis to roughen the surface of a substrate, on which the light is struck. As a treatment for roughening the surface, for example, a method in which the surface of a substrate is directly roughened by sandblasting, embossing or the like, a method in which a coating layer containing a filler is applied to the surface of a substrate, or a method in which a porous film by the so-called sea-and-islands structure is formed on the surface of a substrate is adopted.

With the enhancement of resolution of displays, height and pitch of irregularities in the roughened surface have also been required to be dense. The formation of high-definition images is achieved mainly by densification of image dots. However there is a problem that glittering occurs due to interference when the pitch of the irregularities is greater than the pitch of the image dots, though no problem occurs when the pitch of the irregularities is smaller than that of the image dots. In order to provide glare-free and vivid images with good glare-reduction, it is necessary to make the height and pitch of the irregularities smaller and to control them uniformly.

At present, the method in which a coating layer containing a filler is applied to the surface of a substrate is preferably used because of its advantages that the size of irregularities in the roughened surface can be controlled with comparative ease by the particle size of the filler and that the production is easy. A resin used in a coating formulation is desirably excellent in various properties such as transmission property, heat resistance, abrasion resistance and chemical resistance. Since a high-transparent plastic film poor in heat resistance is often used as the substrate, an ultraviolet curing resin is preferably used as such a resin. As an example thereof, it is proposed in Japanese Patent Application Laid-Open Nos. 105738/1989 and 162261/1993 to use an ultraviolet curing resin and a silica pigment.

In the roughened surface layer composed of the ultraviolet curing resin and the silica pigment proposed in the above-described publications, however, the dispersibility of the silica pigment is not always said to be satisfactory, and moreover there has been a problem that since the coating layer before ultraviolet curing is in a state of a low-viscosity liquid, particles of the filler in the coating layer adhere to one another to aggregate (form orange peel) between the application of the coating fluid to the substrate and ultraviolet-light irradiation. When the content of the filler is increased for the purpose of densifying the irregularities in the surface of the coating layer, or the coating fluid is diluted with a solvent or the like for the purpose of projecting the filler from the surface of the coating layer, this phenomenon becomes particularly marked.

These proposals have had a drawback that since the silica pigment having high oil absorption property is used as a pigment, the resulting roughened surface layer is easy to absorb oil and fat such as fingerprints and is hence easy to stain. They have also had problems that this stain is difficult to remove even by wiping it with cloth soaked with a solvent and that since fibers of the cloth adhere to the wiped part, or the pigment is abraded to make the surface white, the contrast of images is reduced upon its application to a display.

SUMMARY OF THE INVENTION

The present invention has been completed as a result of the investigations undertaken by the inventors with an object to overcome the above described problems and disadvantages in the prior art. The object of the present invention is accordingly to provide a novel and improved display exhibiting an excellent antiglare effect by preventing imaging reflection of external light sources such as the sun, fluorescent lamps and the like on the imaging screen of the display and capable of giving sharp display images of high resolution without glittering and also to provide an antiglare material suitable for use on a full-color display screen. The present invention also has an object to provide a polarizing film by utilizing the above mentioned antiglare material.

According to the present invention, there is thus provided an antiglare material comprising a transparent substrate provided with a roughened surface layer on one or both sides thereof, wherein the roughened surface layer is formed from an ultraviolet curing resin containing at least an epoxy compound and a photo-cationic polymerization initiator, and beads of resin, and the beads of resin have a particle size distribution that particles having a particle size ranging from 0.5 to 6.0 μm are contained in a proportion of at least 60 wt. %, and particles having a particle size greater than 6.0 μm are contained in a proportion lower than 20 wt. %. In the antiglare material of the present invention it is preferred to have the HAZE value in a range of 3–30 as measured in accordance with JIS K 7105. It is further preferred to use cross-linked acrylic resin beads as the beads of resin.

According to the present invention, there is also provided a polarizing film which is a laminate comprising a polarizing substrate, the first protective material provided on one side of said polarizing substrate, and the second protective material provided on the other side of said polarizing substrate, wherein the first protective material comprises a transparent substrate and a roughened surface layer formed from an ultraviolet curing resin containing at least an epoxy compound and a photo-cationic polymerization initiator, and beads of resin, and is laminated in such a manner that an unroughened surface thereof comes into contact with the polarizing substrate, and said beads of resin have a particle size distribution that particles having a particle size ranging from 0.5 to 6.0 μm are contained in a proportion of at least 60 wt. %, and particles having a particle size greater than 6.0 μm are contained in a proportion lower than 20 wt. %. In the polarizing film of the present invention, it is preferred to have the HAZE value of the first protective material in a range of 3–30 as measured in accordance with JIS K 7105. It is further preferred to use cross-linked acrylic resin beads as the beads of resin.

In the antiglare material and the polarizing film making use of such a material, both the transparent substrate and the second protective material may preferably to be transparent films.

DETAILED DESCRIPTION OF PREFERRED EMBODIMENTS

Figure 1:
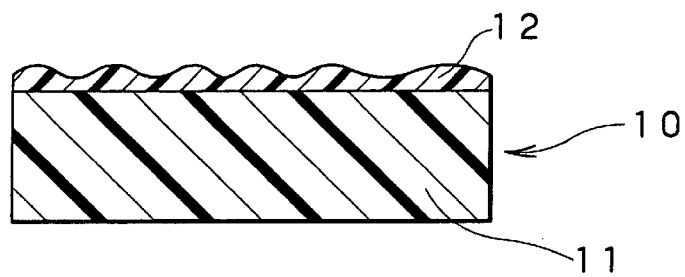
FIG. 1 is a schematic cross-sectional view illustrating the construction of an antiglare material according to the present invention.

The embodiments of the present invention will hereinafter be described in detail.

First of all, as the transparent substrate in the antiglare material according to the present invention, may be used any of the conventionally known transparent films, glass and the like. Specific examples of preferably usable substrates include films of various resins such as polyethylene terephthalate (PET), triacetyl cellulose, polyarylate, polyimide, polyether, polycarbonate, polysulfone, polyether sulfone, cellophane, aromatic polyamide, polyethylene, polypropylene and polyvinyl alcohol, and glass substrates such as silica glass and soda glass.

Although it is desirable that the light transmissivity of these transparent substrates is as high as possible, the light transmissivity determined according to JIS C 6714 should be at least 80% or, preferably at least 90%. When the transparent substrate is for an antiglare material mounted on a small and light-weight liquid crystal display device, the transparent substrate is preferably a plastic film. While it is a desirable condition that the thickness of the transparent substrate is as thin as possible from the standpoint of decreasing the overall weight, the thickness should be in the range from 1 μm to 5 mm in consideration of the productivity and other factors of the antiglare material.

The surface of the transparent substrate is preferably subjected to a surface treatment such as alkali treatment, corona treatment, plasma treatment, fluorine treatment or sputter treatment, or a surface modifying treatment such as application of a silane coupling agent or Si deposition. This treatment permits enhancing adhesion between the transparent substrate and the roughened surface layer.

The ultraviolet curing resin and the beads of resin forming the roughened surface layer according to the present invention will now be described.

In the present invention, the ultraviolet curing resin comprises, an essential components, an epoxy compound as a main component and a photo-cationic polymerization initiator as a polymerization initiator. In order to control properties of a coating fluid and a coating film, such as viscosity, cross linking density, heat resistance and chemical resistance, however, an acrylic compound may preferably be mixed. The advantages of the use of the ultraviolet curing resin according to the present invention in the roughened surface layer over the use of the conventional radical reaction type ultraviolet curing resin are as follows:

(1) undergoing less inhibition by oxygen;

(2) undergoing cure shrinkage to a much smaller extent;

(3) having further excellent adhesion to the transparent substrate;

(4) having further excellent dispersing quality for the beads of resin; and (5) being easier to cure and further excellent in productivity.

Examples of the epoxy compound as the main component of the ultraviolet curing resin according to the present invention include glycidyl ethers such as tetramethylene glycol diglycidyl ether, propylene glycol diglycidyl ether, neopentyl glycol diglycidyl ether and bisphenol A diglycidyl ether, epoxy esters such as 2-hydroxy-3-phenoxypropyl acrylate and bisphenol A-diepoxy-acrylic acid adducts, and monomers such as alicyclic epoxy compounds represented by the following formulae and oligomers thereof.

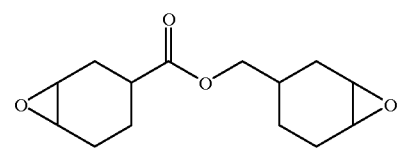

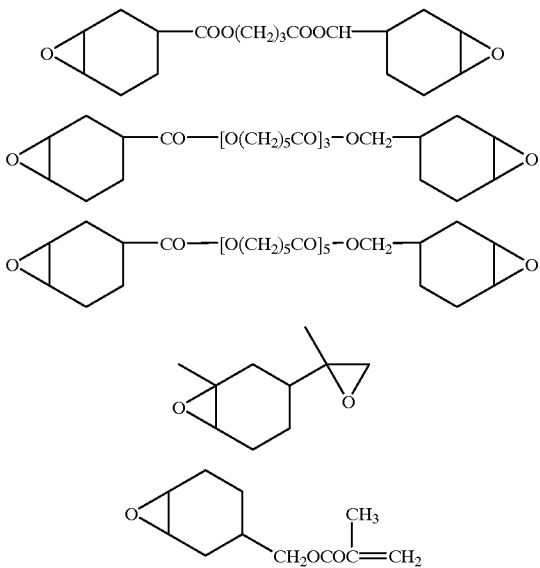

Examples of the acrylic compound usable as a mixture with the epoxy compound include acrylic acid derivatives such as monofunctional acrylate compounds such as lauryl acrylate, ethoxydiethylene glycol acrylate, methoxytriethylene glycol acrylate, phenoxyethyl acrylate, tetrahydrofurfuryl acrylate, isobornyl acrylate, 2-hydroxyethyl acrylate, 2-hydroxypropyl acrylate and 2-hydroxy-3-phenoxy acrylate, and polyfunctional acrylate compounds such as neopentyl glycol diacrylate, 1,6-hexanediol diacrylate, trimethylolpropane triacrylate, pentaerythritol triacrylate, dipentaerythritol triacrylate, dipentaerythritol hexaacrylate, tripentaerythritol polyacrylates, tetrapentaerythritol polyacrylates and trimethylolpropane acrylate benzoate; methacrylic acid derivatives such as monofunctional methacrylate compounds such as 2-ethylhexyl methacrylate, n-stearyl methacrylate, cyclohexyl methacrylate, tetrahydrofurfuryl methacrylate, 2-hydroxyethyl methacrylate and 2-hydroxybutyl methacrylate, and polyfunctional methylacrylate compounds such as 1,6-hexanediol dimethacrylate, trimethylolpropane trimethacrylate and glycerol dimethacrylate; and monomers such as urethane acrylate compounds such as glycerol dimethacrylate hexamethylene diisocyanate and pentaerythritol triacrylate hexamethylene diisocyanate and oligomers thereof.

When the acrylic compound is used, it is mixed in a proportion of preferably 10–70 wt. %, particularly preferably 30–60 wt. % into the roughened surface layer.

As examples of the photo-cationic polymerization initiator, may be mentioned the following compounds:

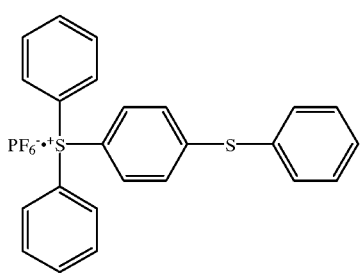

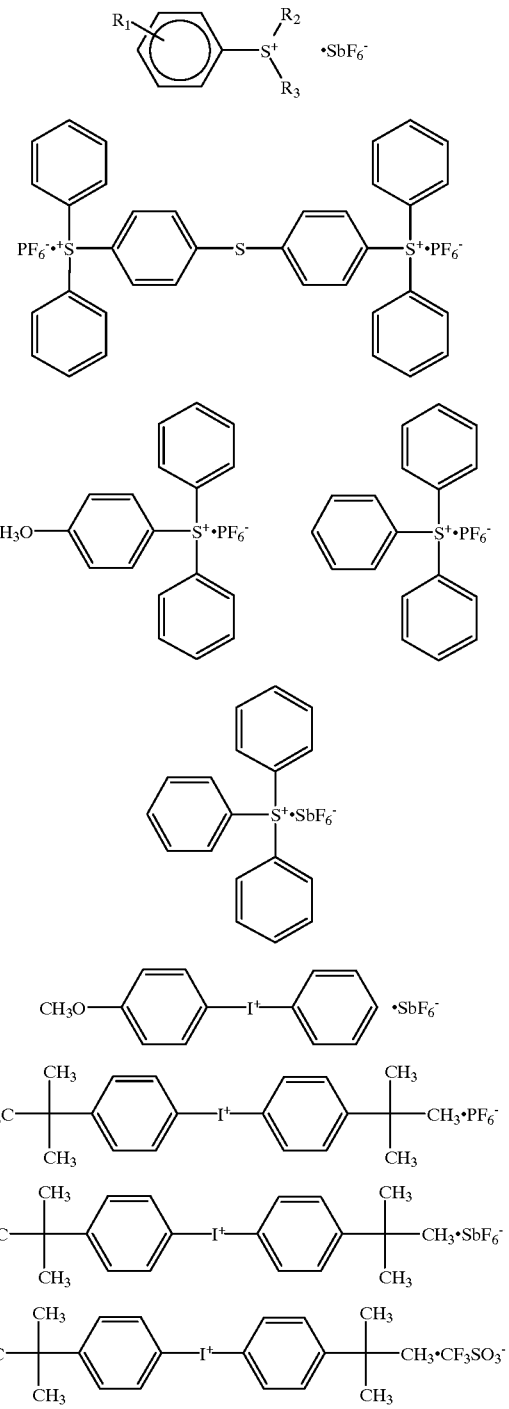

wherein $R_1$, $R_2$ and $R_3$ independently denote a hydrogen atom or an alkyl group having 1–10 carbon atoms.

These compounds may be used either singly or in any combination thereof.

The compounding amount of the photo-cationic polymerization initiator is desirably within a range of 0.1–5.0 wt. %. If the compounding amount is less than 0.1 wt. % or more than 5.0 wt. %, the coating layer formed is not sufficiently cured by ultraviolet-light irradiation.

When the roughened surface layer is formed using the ultraviolet curing resin, the volumetric shrink (calculated out in accordance with the following equation) of the roughened surface layer attendant upon ultraviolet curing is desirably at most 20%. If the volumetric shrink is higher than 20%, curling occurs to a marked extent when the transparent substrate is a film, while the adhesion of the roughened surface layer is lowered when the transparent substrate is formed of a rigid material such as glass. Incidentally, the volumetric shrink (D) is calculated out in accordance with the equation:

$$\text{Volumetric shrink } (D)=(S-S')/S\times 100$$

wherein S is a specific gravity of the roughened surface layer before curing, and S' is a specific gravity of the roughened surface layer after curing.

The specific gravity is measured in accordance with the pycnometer method of JIS K 7112 Method B.

The ultraviolet curing resin according to the present invention preferably has a higher transparency. As with the case of the transparent substrate, those having a light transmissivity (measured in accordance with JIS C 6714) of at least 80%, preferably at least 90% are used. Incidentally, the transparency of the antiglare material is also affected by the refractive index of the ultraviolet curing resin. In the present invention, therefore, the refractive index of the ultraviolet curing resin is preferably not higher than that of the transparent substrate.

The beads of resin will now be described. As the beads of resin, it is preferred to use organic fillers such as acrylic resin, polystyrene resin, epoxy resin, silicone resin, etc. and particularly spherical fillers. Of these, cross-linked acrylic resin beads are particularly preferred, because they are excellent in dispersibility in the above described ultraviolet curing resin used for forming roughened surface.

The crosslinked acrylic resin beads are beads of a crosslinked polymer or copolymer obtained by using one or more of acrylic monomers such as acrylic acid and alkyl or aryl esters thereof, methacrylic acid and alkyl or aryl esters thereof, acrylamide and acrylonitrile, a polymerization initiator, for example, persulfuric acid, and a crosslinking agent, for example, ethylene glycol dimethacrylate, and conducting polymerization by a suspension polymerization process or the like. Those prepared by using methyl methacrylate as an acrylic monomer are particularly preferred. Since the crosslinked acrylic resin beads are spherical or substantially spherical and have no oil absorption property, they can develop excellent stain resistance when used in the roughened surface layer. The crosslinked acrylic resin beads may also be subjected to a surface modifying treatment with an organic or inorganic material such as oil and fat, a silane coupling agent or a metal oxide in order to improve dispersibility in the coating formulation.

The beads of resin used in the present invention must have a particle size distribution that particles having a particle size ranging from 0.5 to 6.0 µm are contained in a proportion of at least 60 wt. %, and particles having a particle size greater than 6.0 µm are contained in a proportion lower than 20 wt. %. Those having a particle size distribution that particles having a particle size ranging from 0.5 to 6.0 µm are contained in a proportion of at least 80 wt. %, and particles having a particle size greater than 6.0 µm are contained in a proportion lower than 10 wt. % are particularly preferred. If the particles having a particle size ranging from 0.5 to 6.0 µm are contained in a proportion lower than 60 wt. %, or the particles having a particle size greater than 6.0 µm are contained in a proportion of at least 20 wt. %, glittering occurs in the resulting display. If the particles having a particle size ranging from 0.5 to 6.0 µm are contained in a proportion lower than 60 wt. %, and the particles having a particle size greater than 6.0 µm are contained in a proportion lower than 20 wt. %, glittering occurs in the resulting display, and the glare-reduction of the display is deteriorated.

In the present invention, the compounding amount of the beads of resin is preferably within a range of 0.5–30 wt. %, particularly 1–15 wt. % based on the total solids in the coating formulation. If the compounding amount is less than 0.5 wt. %, the glare-reducing effect of the resulting roughened surface layer becomes insufficient. If the compounding amount exceeds 30 wt. %, the durability, such as abrasion resistance and environmental resistance, of the resulting roughened surface layer is deteriorated.

As a method for forming the roughened surface layer on one or both sides of the transparent substrate in the present invention, it is used a method in which the above-described ultraviolet curing resin and the beads of resin are dispersed, with water or an organic solvent as needed, by means of a paint shaker, sand mill, pearly mill, ball mill, attritor, roll mill, high-speed impeller dispersion mixer, jet mill, high-speed impact mill, ultrasonic dispersing machine or the like to prepare a coating fluid or ink, and the coating fluid or ink is applied as a single- or multi-layer film onto one or both sides of the transparent substrate by a coating method such as air doctor coating, blade coating, knife coating, reverse-roll coating, transfer roll coating, grafvure roll coating, kiss roll coating, cast coating, spray coating, slot-orifice coating, calendar coating, electrodeposition coating, dip coating or die coating; or a printing method, such as relief printing such as flexographic printing, intaglio printing such as direct gravure printing or offset gravure printing, lithographic printing such as offset printing, or stencil printing such as screen printing. In order to improve the coating property of the coating fluid and the printability of the ink, additives, such as a leveling agent such as silicone oil, and a hardening agent may be used as needed.

In the present invention, the thickness of the roughened surface layer is preset within a range of 0.5–10 µm, preferably 1–5 µm. If the thickness of the roughened surface layer is thinner than 0.5 µm, the abrasion resistance of the roughened surface layer is deteriorated, and the ultraviolet curing resin becomes liable to undergo inhibition by oxygen, resulting in a failure in curing. If the thickness is thicker than 10 µm on the other hand, curling occurs in the resulting antiglare material due to cure shrinkage of the ultraviolet curing resin, microcracks are generated in the roughened surface layer, and the adhesion between the roughened surface layer and the transparent substrate is deteriorated.

Although the antiglare material according to the present invention is produced in the above-described manner, its HAZE value is preferred to fall within a range of 3–30 as measured in accordance with JIS K 7105. If the HAZE value is lower than 3, the glare-reduction of the antiglare material becomes poor. If the HAZE value is higher than 30 on the other hand, the image contrast of the resulting display becomes poor, so that visibility is impaired, and a function as a display is lowered. The HAZE value here implied is a parameter to express the degree of haziness of a transparent material and can be obtained by the measurement using an integrating sphere light transmissivity photometer to give the diffusion transmission Hd% and the overall light transmissivity Ht%, from which the hase value can be calculated by the following equation:

$$\text{HAZE value}=Hd/Ht\times 100$$

The polarizing film according to the present invention will now be described.

The polarizing film according to the present invention is constructed by laminating a first protective material, which is provided with the roughened surface layer on one side thereof, on one side of a polarizing substrate in such a manner that an unroughened surface of the first protective material, i.e., a side on which no roughened surface layer is provided, comes into contact with the polarizing substrate, and laminating a second protective material on the other side of the polarizing substrate.

In the present invention, a material capable of forming a transparent film is used as a material for forming the polarizing substrate. Specific examples of usable materials include polyvinyl alcohol and ethylene-vinyl acetate copolymers. The polarizing film is formed with any of the above-described materials. A film obtained by stretching the material may preferably be used. A preferable example thereof includes a film of polyvinyl alcohol (PVA) obtained by uniaxially stretching polyvinyl alcohol on which iodine or a dye as a dichromatic element has been adsorbed. The thickness of the polarizing substrate is preferably within a range of 10–80 μm. The polarizing substrate formed on the PVA film has disadvantages that it is easy to tear because of its insufficient strength and has high dependence of shrink on humidity. In the present invention, however, such disadvantages are solved because the first and second protective materials are respectively laminated on both sides of the polarizing substrate.

A transparent substrate used in the first protective material in the present invention is preferably a transparent film. Specific examples thereof include films of various resins such as polyethylene terephthalate (PET), triacetyl cellulose, polyarylate, polyimide polyether, polycarbonate, polysulfone, polyether sulfone, cellophane, aromatic polyamide, polyethylene, polypropylene and polyvinyl alcohol. As the second protective material, is used a transparent film of a high-molecular compound, for example, a cellulosic film such as a triacetyl cellulose film, polyester film, or polycarbonate film. The thickness of these films is preferably within a range of 10–2000 μm. These films are preferably formed using a gelling agent such as boric acid or subjected to a heat treatment of formalizing treatment, because the water resistance of the film can be improved.

In the polarizing film according to the present invention, the HAZE value of the first protective material is preferred to fall within a range of 3–30 as measured in accordance with JIS K 7105. If the HAZE value is lower than 3, the glare-reduction of the polarizing film becomes poor. If the HAZE value is higher than 30 on the other hand, the image contrast of the resulting display becomes poor, so that visibility is impaired, and a function as a display is lowered.

Preferable embodiments of the polarizing film according to the present invention include a polarizing film of a structure that the fist protective material, on which the roughened surface layer has been formed, and the second protective material are separately laminated on both sides of a polarizing substrate obtained by uniaxially stretching a PVA film about 3–4 times and immersing the resultant stretched PVA film in an iodide ion of higher order with a polyester adhesive, polyacrylic adhesive, polyurethane adhesive or polyvinyl acetate adhesive.

The present invention will hereinafter be described in detail with reference to the drawings.

FIG. 1 is a schematic cross-sectional view illustrating the construction of an antiglare material according to an embodiment of the present invention. In FIG. 1, the antiglare material 10 has a layer structure that a roughened surface layer 12 is provided on one side of a transparent substrate 11.

Figure 2:
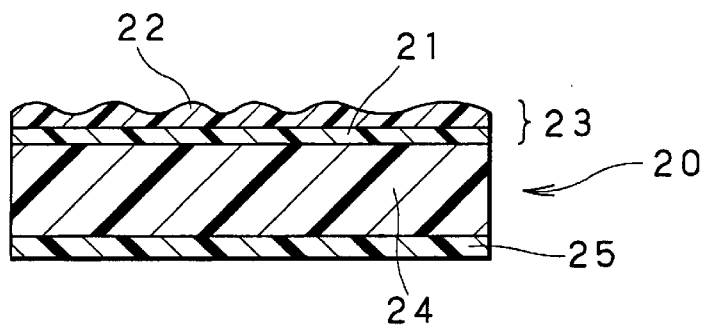
FIG. 2 is a schematic cross-sectional view illustrating the construction of a polarizing film making use of the antiglare material according to the present invention.

FIG. 2 is a schematic cross-sectional view illustrating the construction of a polarizing film 20 according to the present invention. In FIG. 2, the polarizing film 20 has a layer structure that a first protective material 23 comprising a transparent substrate 21 and a roughened surface layer 22 provided thereon is laminated one side of a polarizing substrate 24, and a second protective material 25 is laminated on the other side of the polarizing substrate 24.

Figure 3:
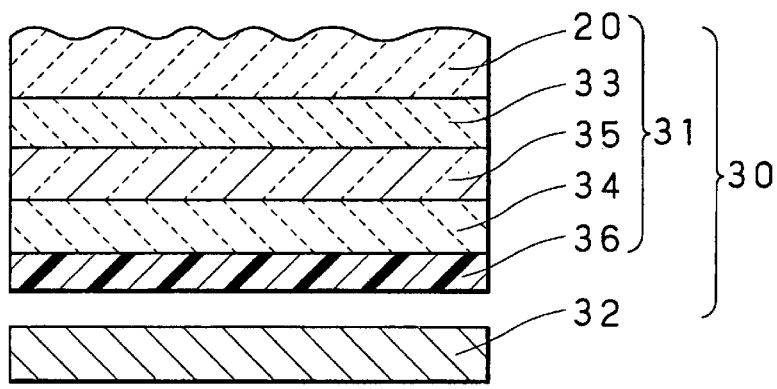
FIG. 3 is a schematic cross-sectional view of a liquid crystal display equipped with the polarizing film according to the present invention.

FIG. 3 is a schematic cross-sectional view illustrating, as an example of use of the antiglare material according to the present invention, the construction of a liquid crystal display the glare-reducing effect of which has been improved. In FIG. 3, the liquid crystal display device 30 is constructed by laminating an upper liquid crystal panel 31 and a lower backlight source 32 such as an electroluminescence device (EL) or lamp on each other. For example, a twisted nematic (TN) liquid crystal cell may be used as the liquid crystal panel. In FIG. 3, the TN liquid crystal cell is used as the liquid crystal panel.

The TN liquid crystal cell has a layered structure in which a nematic liquid crystal 35 fills the space between two glass substrates 33, 34 each provided with a patterned transparent electrode 33', 34' coated with a polyimide solution to form an orientation film followed by a rubbing procedure to effect orientation, the peripheries of the glass substrates being sealed with an epoxy resin or the like. Orientation of the nematic liquid with 90° twisting is caused by the orienting effect of the orientation films. A polarizing film 20 having a roughened surface is mounted on the surface of one of the glass substrates 33 forming this TN liquid crystal cell opposite to the backlight source while another polarizing film 36 having no roughened surface layer is mounted on the surface of the glass substrate 34 facing the backlight source in such a fashion that the polarization angles of the two polarizing films 20, 36 are twisted each from the other by an angle of 90° to complete the liquid crystal panel 31.

When driving signals are applied to the transparent electrodes of the TN liquid crystal panel 31, an electric field is generated between the electrodes to which the signals have been applied. At this time, the major axes of liquid crystal molecules become parallel to the direction of the electric field due to the electronic anisotropy inherent in the liquid crystal molecules, so that the optical rotatory power by the liquid crystal molecules is lost. As a result, the liquid crystal panel is in a state that light is not transmitted. The display of an image is recognized as visible information according to contrast caused by a difference in optical transmission at this time. Accordingly, the above-described liquid crystal display 30 is allowed to display an image by striking the light from the back light source 32 on the liquid crystal panel 31 to bring the contrast between a part through which the light passes and apart through which the light does no pass in the liquid crystal panel 31.

Figure 4:
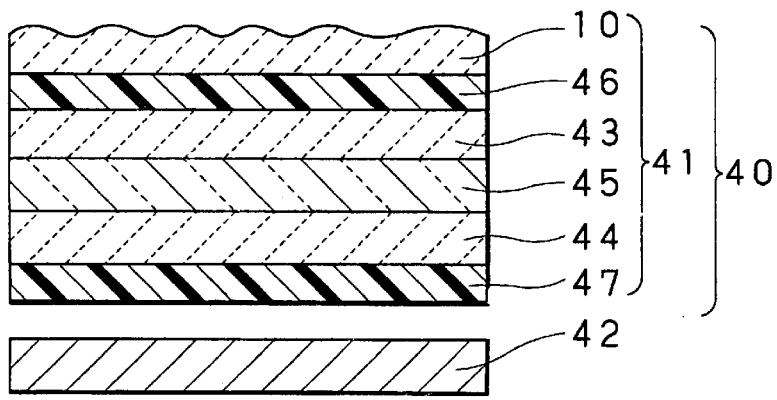
FIG. 4 is a schematic cross-sectional view of another liquid crystal display making use of the antiglare material according to the present invention.

FIG. 4 is a schematic cross-sectional view illustrating the construction of another liquid crystal display making use of the antiglare material according to the present invention. In FIG. 4, the liquid crystal display 40 is formed by laminating a liquid crystal panel 41 on a back light source 42 situated under that. The liquid crystal panel 41 is constructed from two glass substrates 43, 44, nematic liquid crystals 45 interposed between the glass substrates, an upper polarizing film 46 having no roughened surface layer provided on the outside of the glass substrate, a lower polarizing film 47 having no roughened surface layer provided on the outside of the glass substrate, and the antiglare material 10 provided on the upper polarizing film 46.

The antiglare material according to the present invention has a layer structure that the roughened surface layer formed from the ultraviolet curing resin containing at least the epoxy compound and the photo-cationic polymerization initiator, and the beads of resin having the predetermined particle size distribution is provided on one or both sides of the transparent substrate and has the predetermined HAZE value, and so exhibits good glare-reduction and can develop vivid and high-definition image contrast free of any glittering when used in image displays such as CRT and LCD. Further, the polarizing film produced by using the antiglare material according to the present invention has good glare-reducing effect, exhibits excellent image contrast free of any glittering and is hence useful for image displays such as liquid crystal panels.

EXAMPLES

The present invention will hereinafter be described specifically by the following Examples. Incidentally, all designations of "part" or "parts" as will be used in the following Examples mean part of parts by weight unless expressly noted.

Example 1

A dispersion of the following composition obtained by dispersing a mixture of beads of a crosslinked acrylic resin and toluene for 30 minutes in a sand mill, and a base coating formulation of the following composition were first stirred and mixed with each other for 15 minutes in a disperser, thereby obtaining a coating fluid. This coating fluid was coated on one side of a transparent substrate formed of triacetyl cellulose and having a thickness of 80 $\mu$m and a transparency of 92% by a reverse-roll coating method and dried at 100° C. for 2 minutes. The thus-obtained dry film was then subjected to ultraviolet-light irradiation by means of a condenser-type high pressure mercury lamp of 120 W/cm under conditions of irradiation distance (distance between the center of the lamp and the surface of the coating film) of 10 cm and a treating rate (rate of the coated substrate to the mercury lamp) of 5 m/min, thereby curing the coating film. In this manner, an antiglare material having a roughened surface layer 2.5 $\mu$m thick and a HAZE value of 16.5 was obtained.

| [Composition of the dispersion] | |
|---|---|
| Crosslinked acrylic resin beads | 9 parts |
| [TRADE name: MX150 (Crosslinked polymethyl methacrylate); particle size: 1.5 ± 0.5 $\mu$m; product of Soken Chemical & Engineering Co., Ltd.; containing 99 wt. % of particles having a particle size ranging from 0.5 to 6.0 $\mu$m and less than 1 wt. % of particles having a particle size greater than 6.0 $\mu$m] | |
| Toluene | 210 parts |
| [Composition of the base coating formulation] | |
| Acrylic compound (Dipentaerythritol triacrylate) | 45 parts |
| Epoxy compound (Trade name: Celloxide 2021; product of Daicel Chemical Industries, Ltd.) | 45 parts |
| Photo-cationic polymerization initiator | 2 parts |
| 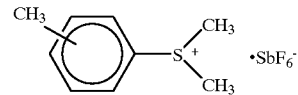 | |
| Isopropyl alcohol | 5 parts |

Example 2

An antiglare material having a roughened surface layer 3.6 $\mu$m thick and a HAZE value of 22.0 was obtained in the same manner as in Example 1 except that the roughened surface layer was formed with the following dispersion and base coating formulation.

| [Composition of the dispersion] | |
|---|---|
| Crosslinked acrylic resin beads | 14 parts |
| [Trade name: MX300 (crosslinked polymethyl methacrylate); particle size: 3.0 ± 0.5 $\mu$m; product of Soken Chemical & Engineering Co., Ltd.; containing 99 wt. % of particles having a particle size ranging from 0.5 to 6.0 $\mu$m and less than 1 wt. % of particles having a particle size greater than 6.0 $\mu$m] | |
| Toluene | 205 parts |
| [Composition of the base coating formulation] | |
| Acrylic compound (Tripentaerythritol polyacrylate) | 45 parts |
| Epoxy compound (Trade name: Cyracure UVR-6110; product of Union Carbide Corp.) | 45 parts |
| Photo-cationic polymerization initiator (Trade name: Cyracure UVI-6990; product of Union Carbide Corp.) | 2 parts |
| Isopropyl alcohol | 5 parts |

Example 3

An antiglare material having a roughened surface layer 3.8 $\mu$m thick and a HAZE value of 13.0 was obtained in the same manner as in Example 1 except that the roughened surface layer was formed with the following dispersion and base coating formulation.

| [Composition of the dispersion] | |
|---|---|
| Crosslinked acrylic resin beads | 10 parts |
| (Trade name: MX150; particle size: 1.5 ± 0.5 $\mu$m; product of Soken Chemical & Engineering Co., Ltd.; 5 parts) | |
| (Trade name: MX300; particle size: 3.0 ± 0.5 $\mu$m; product of Soken Chemical & Engineering Co., Ltd.; 5 parts) | |
| Toluene | 210 parts |
| [Composition of the base coating formulation] | |
| Acrylic compound (Tetrapentaerythritol polyacrylate: 15 parts) (Neopentyl glycol diacrylate: 30 parts) | 45 parts |
| Epoxy compound (Trade name: Epikote 828; product of Yuka Shell Epoxy Kabushikikaisha) | 45 parts |
| Photo-cationic polymerization initiator (Trade name: Cyracure UVI-6990; product of Union Carbide Corp.) | 2 parts |
| Isopropyl alcohol | 5 parts |

Example 4

An antiglare material having a roughened surface layer 3.8 $\mu$m thick and a HAZE value of 9.0 was obtained in the same manner as in Example 1 except that the roughened surface layer was formed with the following dispersion and base coating formulation.

[Composition of the dispersion]

| | |
|---|---|
| Crosslinked acrylic resin beads | 6 parts |
| (Trade name: MX150; particle size: 1.5 ± 0.5 µm; product of Soken Chemical & Engineering Co., Ltd.; 3 parts) | |
| (Trade name: MX300; particle size: 3.0 ± 0.5 µm; product of Soken Chemical & Engineering Co., Ltd.; 3 parts) | |
| Toluene | 210 parts |
| [Composition of the base coating formulation] | |
| Acrylic compound | 45 parts |
| (Dipentaerythritol polyacrylate: 15 parts) | |
| (Tripentaerythritol polyacrylate: 30 parts) | |
| Epoxy compound | 45 parts |
| (Trade name: Rapi-Cure DVE-3; product of ISP Co.) | |
| Photo-cationic polymerization initiator | 2 parts |
| (Trade name: BBI-102; product of Midori Kagaku Co., Ltd.) | |
| Isopropyl alcohol | 5 parts |

Example 5

An antiglare material having a roughened surface layer 2.5 µm thick and a HAZE value of 6.7 was obtained in the same manner as in Example 1 except that a mixture of a dispersion of the following composition and a base coating formulation of the following composition was coated on one side of a transparent substrate composed of polyethylene terephthalate and having a thickness of 75 µm and a transparency of 89% by a reverse-roll coating method.

[Composition of the dispersion]

| | |
|---|---|
| Crosslinked acrylic resin beads | 3 parts |
| (Trade name: MX300; particle size: 3.0 ± 0.5 µm; product of Soken Chemical & Engineering Co., Ltd.; containing 99 wt. % of particles having a particle size ranging from 0.5 to 6.0 µm and less than 1 wt. % of particles having a particle size greater than 6.0 µm) | |
| Toluene | 210 parts |
| [Composition of the base coating formulation] | |
| Acrylic compound | 50 parts |
| (1,6-Hexanediol dimethacrylate: 20 parts) | |
| (Pentaerythritol triacrylate hexamethylene diisocyanate: 30 parts) | |
| Epoxy compound | 45 parts |
| (Trade name: Epolite 40E; product of Kyoeisha Chemical Co., Ltd.) | |
| Photo-cationic polymerization initiator | 2 parts |
| (Trade name: MP103; product of Midori Kagaku Co., Ltd.) | |
| Isopropyl alcohol | 5 parts |

Comparative Example 1

An antiglare material having a roughened surface layer 3.6 µm thick and a HAZE value of 11.0 was obtained in the same manner as in Example 1 except that the roughened surface layer was formed with the following dispersion and base coating formulation.

[Composition of the dispersion]

| | |
|---|---|
| Crosslinked acrylic resin beads | 5 parts |
| (Trade name: MX300; particle size: 3.0 ± 0.5 µm; product of Soken Chemical & Engineering Co., Ltd.) | |
| Toluene | 200 parts |
| [Composition of the base coating formulation] | |
| Acrylic compound | 90 parts |
| (1,6-Hexanediol dimethacrylate: 45 parts) | |
| (Pentaerythritol triacrylate hexamethylene diisocyanate: 45 parts) | |
| Photo-polymerization initiator | 5 parts |
| (Trade name: Irgacure 184; product of CIBA-GEIGY AG) | |
| Isopropyl alcohol | 10 parts |

Comparative Example 2

An antiglare material having a roughened surface layer 3.0 µm thick and a HAZE value of 35.0 was obtained in the same manner as in Example 1 except that the kind and compounding amount of the crosslinked acrylic resin beads in the roughened surface layer was changed as follows.

| | |
|---|---|
| Crosslinked acrylic resin beads | 20 parts |
| (Trade name: MX300; particle size: 3.0 ± 0.5 µm; product of Soken Chemical & Engineering Co., Ltd.) | |

Comparative Example 3

An antiglare material having a roughened surface layer 3.0 µm thick and a HAZE value of 29.0 was obtained in the same manner as in Example 1 except that the kind and compounding amount of the crosslinked acrylic resin beads in the roughened surface layer was changed as follows.

| | |
|---|---|
| Silica pigment | 9 parts |
| (Trade name: Sylysia #456; product of Fuji Silysia Chemical K.K.; containing 50 wt. % of particles having a particle size ranging from 0.5 to 6.0 µm and 40 wt. % of particles having a particle size greater than 6.0 µm) | |

Comparative Example 4

A triacetyl cellulose film having a thickness of 80 µm and a transparency of 92% was provided as a comparative antiglare material as it is.

Comparative Example 5

An antiglare material having a roughened surface layer 4.2 µm thick and a HAZE value of 17.5 was obtained in the same manner as in Example 1 except that the components of the roughened surface layer was changed as follows.

| | |
|---|---|
| Crosslinked acrylic resin beads | 6 parts |
| (Trade name: MR-7G; product of Soken Chemical & Engineering Co., Ltd.; containing 60 wt. % of particles having a particle size ranging from 0.5 to 6.0 μm and 25 wt. % of particles having a particle size greater than 6.0 μm] | |
| Toluene | 210 parts |
| [Composition of the base coating formulation] | |
| Acrylic compound (Dipentaerythritol triacrylate) | 42 parts |
| Epoxy compound (Trade name: Celloxide 2021; product of Daicel Chemical Industries, Ltd.) | 42 parts |
| Photo-cationic polymerization initiator | 10 parts |

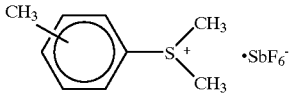

| | |
|---|---|
| Isopropyl alcohol | 5 parts |

Comparative Example 6

An antiglare material having a roughened surface layer 3.0 μm thick and a HAZE value of 13.0 was obtained in the same manner as in Example 5 except that the roughened surface layer was formed with the following dispersion and base coating formulation.

| | |
|---|---|
| [Composition of the dispersion] | |
| Crosslinked acrylic resin beads | 6 parts |
| (Trade name: MR-7G; product of Soken Chemical & Engineering Co., Ltd.; containing 60 wt. % of particles having a particle size ranging from 0.5 to 6.0 μm and 25 wt. % of particles having a particle size greater than 6.0 μm) | |
| Toluene | 210 parts |
| [Composition of the base coating formulation] | |
| Acrylic compound (Dipentaerythritol triacrylate) | 42 parts |
| Epoxy compound (Trade name: Celloxide 2021; product of Daicel Chemical Industries, Ltd.) | 42 parts |
| Photo-cationic polymerization initiator | 10 parts |

Example 6 and Comparative Example 7

The antiglare materials obtained in Examples 1–3 and 5, and Comparative Examples 1–3, 5 and 6 were separately used to produce polarizing films 20 of the construction illustrated in FIG. 2.

Each of these polarizing films 20 was then stuck on a glass substrate 33 as illustrated in FIG. 3 to obtain a liquid crystal display 30.

On the other hand, the antiglare materials obtained in Example 4 and Comparative Example 4 were separately used to produce laminates by sticking each of them on a polarizing film subjected to no surface-roughening treatment through an adhesive in such a manner that the surface of PET faces the polarizing film. The laminates were separately stuck on the polarizing film 46 as illustrated in FIG. 4, thereby obtaining liquid crystal displays 40.

Evaluation

With respect to the respective liquid crystal displays 30 and 40, the image contrast, glittering of image and glare-reducing effect were evaluated in accordance with the following respective methods by presetting an screen size and resolution to 10.4 inches and 800×600 dots, respectively. Besides, the abrasion resistance, chemical resistance and stain resistance were also evaluated in accordance with the following respective methods.

Figure 5:
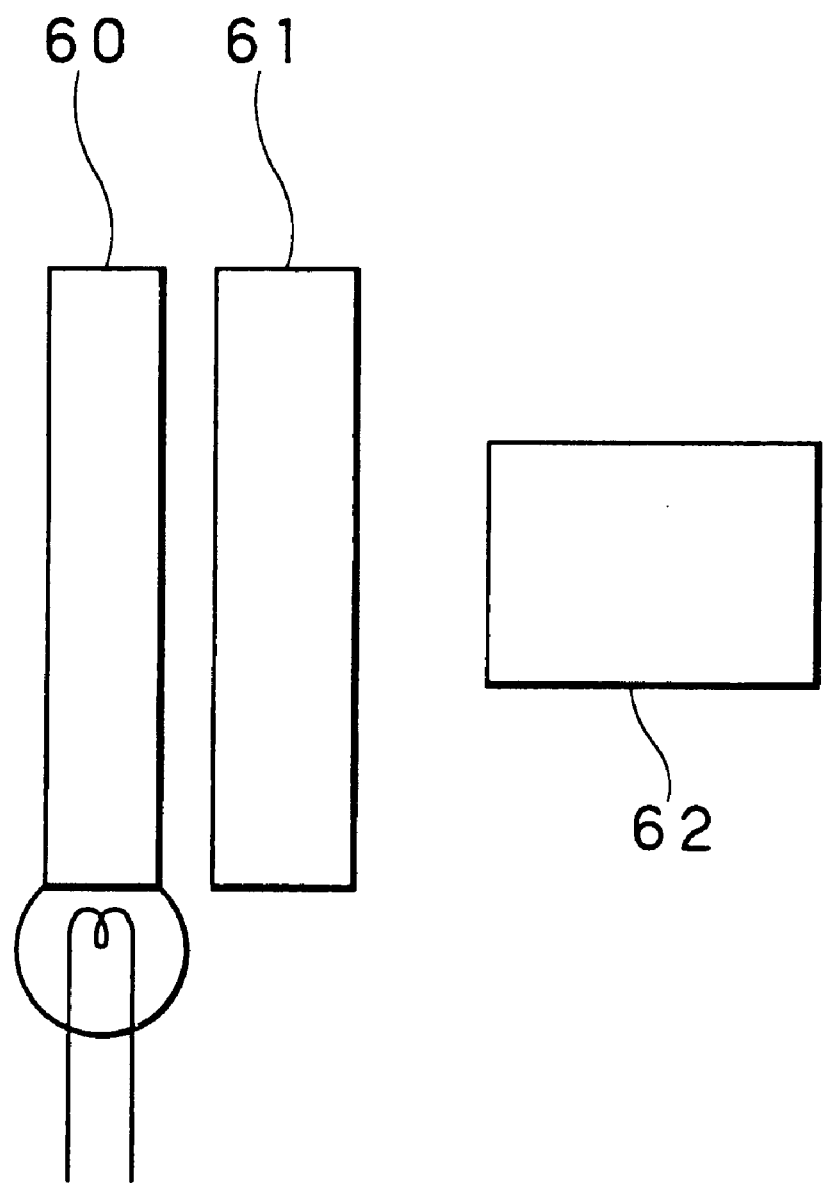
FIG. 5 is a conceptual view illustrating the arrangement of a measuring apparatus for image contrast.

Evaluation of the image contrast was undertaken according to the procedure specified in JIS C 7072-1988 for the testing method of the contrast ratio (CR) of liquid crystal display panels. FIG. 5 of the accompanying drawing schematically illustrates the relative positions of the light source, liquid crystal panel and photometer using in the measurement of the image contrast. In the measurement, the distances between the light source 60 and liquid crystal panel 61 and between the liquid crystal panel 61 and photometer 62 were 1 cm and 50 cm, respectively, and the aperture angle of the photometer 62 was 5 degrees. The light source was an electroluminescence panel of 5 watts output and the photometer was Model LS-100 manufactured by Minolta Camera Co., Ltd. The results of the image contrast measurement were recorded in the following four rankings.

A: CR was 4 or higher;
B: CR was 3 or higher, but lower than 4;
C: CR was 2 or higher, but lower than 3;
D: CR was lower than 2.

The glittering of image was evaluated by connecting a test liquid crystal display to a personal computer in such a manner than an opening image of Paint Brush in Windows Version 3.1 can be displayed, and having whether littering occurred or not in the image of white-and-black display visually judged by 10 panel members. The glittering of image was ranged in accordance with the following standard:

A: The number of panel members who felt the image glittering was smaller than 3;
B: The number of panel members who felt the image glittering was not smaller than 3, but smaller than 7;
C: The number of panel members who felt the image glittering was not smaller than 7.

The glare-reducing effect was evaluated by determining the mapping property of a test display in optical comb width of 2 mm by transmission mode using a mapping meter ICM-1DP (JIS K 7105) manufacture by Suga Test Instruments Co., Ltd. The smaller the numerical value of measurement data, the higher the glare-reducing effect. The glare-reducing effect was ranked in accordance with the following standard:

A: Lower than 50%;
B: Not lower than 50%, but lower than 70%;
C: Not lower than 70%.

The abrasion resistance was evaluated by setting Steel Wool #0000 produced by Nippon Steel Wool K.K. in an abrasion resistance tester for paperboard (manufactured by Kumagai Riki Kogyo K.K.), reciprocating a test antiglare material 50 times under a load of 200 g in such a manner that the roughened surface layer of the antiglare material comes into contact with the steel wool and then determining a change in HAZE value (δH) (calculated out in accordance with the following equation) at the contact part by means of a HAZE meter manufactured by Toyo Seiki Seisakusho, Ltd. The greater the measurement value, the poor the abrasion resistance. Incidentally, the measurement of HAZE value was conducted on the antiglare material alone.

Change in HAZA value (δH)=(HAZE value after test)=(HAZE value before test)

The chemical resistance was evaluated by soaking a swab (product of Johnson Company, Ltd.) with isopropyl alcohol, rubbing the roughened surface layer of a test antiglare material 50 times with the swab and observing whether the roughened surface layer underwent a change or not.

The chemical resistance was ranked as C where the roughened surface layer underwent a marked change such as separation, A where the roughened surface layer underwent to change, or B where the roughened surface layer underwent an in-between change.

The stain resistance was evaluated by dropping a drop of rapeseed oil on the roughened surface layer of a test antiglare material by a dropping pipette, reciprocatorily rubbing the surface, on which the rapeseed oil had been dropped, 20 times with BEMCOT (Trade name, product of Ashai Chemical Industry Co., Ltd.) soaked with ligroin and then taking an SEM photograph of the rubbed surface, thereby ascertaining whether the surface was scratched or not, or the fibers of BEMCOT adhered to the surface of not. The stain resistance was ranked as C where a scratch or adhesion of the BEMCOT fibers was markedly recognized on the roughened surface layer, A where the roughened surface layer underwent no change, or B where the roughened surface layer underwent an in-between change.

The evaluation results are shown collectively in Table 1.

ranging from 0.5 to 6.0 μm are contained in a proportion of at least 60 wt. %, and particles having a particle size greater than 6.0 μm are contained in a proportion lower than 20 wt. %.

2. The antiglare material according to claim 1, wherein the ultraviolet curing resin contains an acrylic compound.

3. The antiglare material according to claim 1, wherein said beads of resin are crosslinked acrylic resin beads.

4. The antiglare material according to claim 3, wherein the crosslinked acrylic resin beads are formed by using methyl methacrylate as a monomer component.

5. The antiglare material according to claim 1, wherein the transparent substrate is a transparent film.

6. The antiglare material according to claim 1, wherein the HAZE value of the material falls within a range of 3–30 as measured in accordance with JIS K 7105.

7. A polarizing film which is a laminate comprising a polarizing substrate, the first protective material provided on one side of said polarizing substrate, and the second protective material provided on the other side of said polarizing substrate, wherein the first protective material comprises a transparent substrate and a roughened surface layer formed from an ultraviolet curing resin containing at least an epoxy compound and a photo-cationic polymerization initiator, and beads of resin, and is laminated in such a manner that an unroughened surface thereof comes into contact with the polarizing substrate, and said beads of resin have a particle size distribution that particles having a particle size ranging from 0.5 to 6.0 μm are contained in a proportion of at least 60 wt. %, and particles having a particle size greater than 6.0 μm are contained in a proportion lower than 20 wt. %.

8. The polarizing film according to claim 7, wherein the ultraviolet curing resin contains an acrylic compound.

9. The polarizing film according to claim 7, wherein said beads of resin are crosslinked acrylic resin beads.

10. The polarizing film according to claim 9, wherein the crosslinked acrylic resin beads are formed by using methyl methacrylate as a monomer component.

TABLE 1

| Antiglare material | HAZE value | Image contrast | Glittering | Glare-reducing effect | Abrasion resistance | Chemical resistance | Stain resistance |
| --- | --- | --- | --- | --- | --- | --- | --- |
| Example 1 | 16.5 | B | A | A | 1.2 | A | A |
| Example 2 | 22.0 | B | A | A | 2.4 | A | A |
| Example 3 | 13.0 | A | A | A | 2.3 | A | A |
| Example 4 | 9.0 | A | A | A | 1.2 | A | A |
| Example 5 | 6.7 | A | A | B | 0.6 | A | A |
| Comparative Example 1 | 11.0 | B | C | A | 1.3 | A | A |
| Comparative Example 2 | 35.0 | D | B | A | 5.6 | A | B |
| Comparative Example 3 | 29.0 | C | C | A | 3.7 | A | C |
| Comparative Example 4 | 0.3 | B | A | C | 53.4 | A | C |
| Comparative Example 5 | 17.5 | A | C | A | 25.4 | C | A |
| Comparative Example 6 | 13.0 | A | A | A | 43.2 | C | C |

What is claimed:

1. An antiglare material comprising a transparent substrate provided with a roughened surface layer on one or both sides thereof, wherein the roughened surface layer is formed from an ultraviolet curing resin containing at least an epoxy compound and a photo-cationic polymerization initiator, and beads of resin, and said beads of resin have a particle size distribution that particles having a particle size 11. The polarizing film according to claim 7, wherein the transparent substrate and the second protective material are transparent films.

12. The polarizing film according to claim 7, wherein the HAZE value of the material falls within a range of 3–30 as measured in accordance with JIS K 7105.

* * * * *